US009469143B1

(12) United States Patent
Keoshkerian et al.

(10) Patent No.: US 9,469,143 B1
(45) Date of Patent: Oct. 18, 2016

(54) DIGITAL LITHOGRAPHIC IMAGE FORMING SURFACE INCORPORATING A CARBON BLACK POLYMERIC FILLER

(71) Applicant: XEROX CORPORATION, Norwalk, CT (US)

(72) Inventors: Barkev Keoshkerian, Thornhill (CA); Carolyn Moorlag, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/922,124

(22) Filed: Oct. 24, 2015

(51) Int. Cl.
*B41C 1/10* (2006.01)
*B41N 1/14* (2006.01)
*C09D 5/32* (2006.01)
*C09D 7/12* (2006.01)
*C09D 183/08* (2006.01)
*B41F 7/02* (2006.01)

(52) U.S. Cl.
CPC . *B41N 1/14* (2013.01); *B41C 1/10* (2013.01); *B41F 7/02* (2013.01); *C09D 5/32* (2013.01); *C09D 7/1225* (2013.01); *C09D 183/08* (2013.01)

(58) Field of Classification Search
None
See application file for complete search history.

(56) References Cited

U.S. PATENT DOCUMENTS

2012/0103212 A1 5/2012 Stowe et al.
2016/0122549 A1* 5/2016 Keoshkerian ............ C09C 1/56
524/546

* cited by examiner

*Primary Examiner* — Joshua D Zimmerman
(74) *Attorney, Agent, or Firm* — Ronald E. Prass, Jr.; Prass LLP

(57) ABSTRACT

This disclosure is directed to a plate design for use in variable data digital lithographic image forming devices. The disclosed plate design incorporates surface passivated carbon black filler material particles in a fluorosilicone polymer. The disclosed functionalized carbon black material compositions include hydrophobic carbon black particles surface passivated via the use of an A/B-block copolymer where the A/B block contains a pentafluorostyrene-maleimide alternating polymer and the B block contains pure pentafluorostyrene. The A/B portion allows for the polymer to adsorb onto the carbon black while the b-block acts as the stabilizer in fluorinated systems. Fine dispersions result from the addition of poly (pentafluorostyrene/Maleimide-b-pentafluorostyrene) or P(PFS/MI-b-PFS) passivated carbon black to fluorinated polymers, enhancing the physical and mechanical properties. The disclosed surface passivated carbon black particles are particularly usable for improving operational characteristics of fluorosilocone-based reimageable surface layers of imaging members employed in the variable data digital lithographic image forming devices.

23 Claims, 2 Drawing Sheets

DIGITAL LITHOGRAPHIC IMAGE FORMING SURFACE INCORPORATING A CARBON BLACK POLYMERIC FILLER

BACKGROUND

This application is related to U.S. patent application Ser. No. 14/922,125, entitled "CARBON BLACK POLYMERIC FILLER USEFUL FOR PRINTING APPLICATIONS," filed in the U.S. Patent and Trademark Office on a same day as this application, and co-owned with this application, the disclosure of which is hereby incorporated by reference herein in its entirety.

1. Field of the Disclosed Embodiments

This disclosure relates to image forming systems and methods incorporating a carbon black-containing filler material in reimageable plate surfaces of imaging members for digital lithographic image forming. In particular, the disclosed embodiments are directed to incorporating particularly-modified carbon black filler materials in various marking and printing system components, such as imaging members or plates specifically formed for use in a new class of variable data digital lithographic printing devices.

2. Related Art

Lithographic and offset lithographic image forming are commonly understood printing methods for performing high quality multi-color images on a wide array of image receiving media substrates. For the purposes of this disclosure, the terms "printing," "marking" and "image forming" may be used interchangeably. In a typical lithographic image forming process an image transfer surface, which may be in a form of a flat plate, a surface of a cylinder or drum, a surface of a belt or the like is patterned to include "image regions" generally of hydrophobic/oleophilic materials, and "non-image regions" generally of hydrophilic/oleophobic materials. The image regions correspond to the areas on the final print of an image formed on a target image receiving media substrate that are occupied by a marking material, such as ink, to form the images on the target substrate. The non-image regions correspond to the areas on the final print that are not occupied by the marking material. The hydrophilic regions accept, and are generally readily wetted by surface preparation fluids, which may include water-based fluids or other compound fluids, which may be commonly referred to as dampening fluids or fountain solutions. In embodiments, these dampening fluids conventionally consist of water and small amounts of alcohol and/or other additives and/or surfactants that are included to reduce surface tension of the fluids.

The hydrophobic regions of, for example, a printing plate tend to repel dampening fluid and accept ink, whereas the dampening fluid formed over the hydrophilic regions forms a fluid "release layer" for rejecting the adherence of ink on the imaging surface of the printing plate. The hydrophilic regions of the printing plate thus correspond to unprinted, or "non-image," areas of the final print.

In varying embodiments of conventional systems for lithographic image forming, the ink, as the marking material, may be transferred directly from the imaging surface to a target image receiving media substrate, such as paper or another substrate material at a pressure ink transfer nip. In offset lithographic image forming, the ink may be transferred from the imaging plate surface to an intermediate image transfer surface, such as an offset (or blanket) cylinder. Offset cylinders are often covered with conformable coatings or sleeves with surfaces that can conform to the texture of the imaging plate surface and the target image receiving media substrate, each of which may have, for example, a surface peak-to-valley depth somewhat different from the surface peak-to-valley depth of the other. Surface roughness or conformity of the offset (or blanket) cylinder helps to deliver a more uniform layer of the marking material, including ink, to the target image receiving media substrate free of defects such as mottle. Sufficient pressure is used to transfer the image directly from the imaging plate surface, or from the offset (or blanket) cylinder, to the target image receiving media substrate. This pressure transfer often occurs at a transfer nip through which the target image receiving media substrate is pinched between one of the imaging plate and the offset (or blanket) cylinder, and an opposing pressure member, such as an impression cylinder, that provides the pressure on the non-image side of the target image receiving media substrate.

Typical lithographic and offset lithographic printing techniques employ plates that are permanently patterned, and are, therefore, useful for cost-effective image forming only when printing a large number of copies of the same image (i.e., for long print runs), such as magazines, newspapers, and the like. These techniques are not considered useful in creating and printing documents in which new patterns are generated from one page to the next without removing and replacing the print cylinder and/or the imaging plate. In this regard, conventional lithographic and offset lithographic printing techniques cannot accommodate true high speed variable data printing in which the images may be changeable from impression to impression, for example, as in the case of digital printing systems. Furthermore, the cost of the permanently patterned imaging plates or cylinders is amortized over the number of copies. The cost per printed copy is, therefore, higher for shorter print runs of the same image than for longer print runs of the same image, as opposed to prints from digital printing systems. Additionally, because images do not change from impression to impression, ink transfer efficiency from the imaging plate surface to one or the other of the offset cylinder or target image receiving media substrate can be imprecise. Typical of these conventional systems are in formulations which transfer, on average, as little as 50% of the ink deposited on the imaging plate surface.

SUMMARY OF THE DISCLOSED EMBODIMENTS

In view of the known shortfalls in conventional lithographic image forming with respect to variable data and/or digital image forming, a number of techniques have been attempted to implement truly digital lithographic image forming.

U.S. Patent Application Publication No. 2012/0103212 A1 (the 212 Publication) published May 3, 2012, and based on U.S. patent application Ser. No. 13/095,714, which is commonly assigned and the disclosure of which is incorporated by reference herein in its entirety, proposes systems and methods for providing variable data lithographic and offset lithographic printing of image receiving media marking in an image forming system. The schemes disclosed in the 212 Publication are directed to improvements on various aspects of previously-attempted variable data lithographic marking concepts to achieve effective truly variable digital data lithographic printing.

According to the 212 Publication, a reimageable plate surface is provided on an imaging member, which may be a drum, plate, belt or the like. The reimageable plate surface may be composed of, for example, a class of materials commonly referred to as silicones, including polydimethylsiloxane (PDMS) among others. The reimageable plate surface of the imaging member may be formed of a relatively thin layer over a substantial mounting layer, a thickness of the relatively thin layer being selected to balance printing or marking performance with durability and manufacturability concerns.

The 212 Publication describes an exemplary variable data lithography system 100 such as that shown, for example, in FIG. 1. A general description of the exemplary system 100 shown in FIG. 1 is provided here. Additional details regarding individual components and/or subsystems shown in the exemplary system 100 of FIG. 1 may be found in the 212 Publication.

As shown in FIG. 1, the exemplary system 100 may include an imaging member 110. The imaging member 110 in the embodiment shown in FIG. 1, although depicted as a drum, is not intended to imply that embodiments of such a device are necessarily restricted to containing a drum-type imaging member. The imaging member 110 in the exemplary system 100 is used to apply an inked image to a target image receiving media substrate 114 at a transfer nip 112. The transfer nip 112 is produced by an impression roller 118, as part of an image transfer mechanism 160, exerting pressure in the direction of the imaging member 110.

The exemplary system 100 may be used for producing images on a wide variety of image receiving media substrates 114. The 212 Publication explains the wide latitude of marking (printing) materials that may be used, including marking materials with pigment densities greater than 10% by weight. Increasing densities of the pigment materials suspended in solution to produce different color inks is generally understood to result in increased image quality and vibrance. These increased densities, however, often result in precluding the use of such inks in certain image forming applications that are conventionally used to facilitate variable data digital image forming, including, for example, jetted ink image forming applications.

As noted above, the imaging member 110 may be comprised of a reimageable surface layer or plate formed over a structural mounting layer that may be, for example, a cylindrical core, or one or more structural layers over a cylindrical core. A dampening solution subsystem 120 may be provided generally comprising a series of rollers, which may be considered as dampening rollers or a dampening unit, for uniformly wetting the reimageable plate surface with a layer of dampening fluid or fountain solution, generally having a uniform thickness, to the reimageable plate surface of the imaging member 110. Once the dampening fluid or fountain solution is metered onto the reimageable surface, a thickness of the layer of dampening fluid or fountain solution may be measured using a sensor 125 that provides feedback to control the metering of the dampening fluid or fountain solution onto the reimageable plate surface.

An optical patterning subsystem 130 may be used to selectively form a latent image in the uniform dampening fluid layer by image-wise patterning the dampening fluid layer using, for example, laser energy. As will be discussed in greater detail below, it is advantageous to form the reimageable plate surface of the imaging member 110 from materials that should ideally absorb most of the laser energy emitted from the optical patterning subsystem 130 close to the reimageable plate surface. Forming the plate surface of such materials may advantageously aid in substantially minimizing energy wasted in heating the dampening fluid and coincidentally minimizing lateral spreading of heat in order to maintain a high spatial resolution capability. The mechanics at work in the patterning process undertaken by the optical patterning subsystem 130 of the exemplary system 100 are described in detail with reference to FIG. 5 in the 212 Publication. Briefly, the application of optical patterning energy from the optical patterning subsystem 130 results in selective evaporation of portions of the uniform layer of dampening fluid in a manner that produces a latent image.

The patterned layer of dampening fluid comprising a latent image over the reimageable plate surface of the imaging member 110 is then presented or introduced to an inker subsystem 140. The inker subsystem 140 is usable to apply a uniform layer of ink over the patterned layer of dampening fluid and the reimageable plate surface of the imaging member 110. In embodiments, the inker subsystem 140 may use an anilox roller to meter an ink onto one or more ink forming rollers that are in contact with the reimageable plate surface of the imaging member 110. In other embodiments, the inker subsystem 140 may include other traditional elements such as a series of metering rollers to provide a precise feed rate of ink to the reimageable plate surface. The inker subsystem 140 may deposit the ink to the pockets representing the imaged portions of the reimageable plate surface, while ink deposited on the unformatted portions of the dampening fluid layer will not adhere to those portions.

Cohesiveness and viscosity of the ink residing on the reimageable plate surface may be modified by a number of mechanisms, including through the use of some manner of rheology control subsystem 150. In embodiments, the rheology control subsystem 150 may form a partial crosslinking core of the ink on the reimageable plate surface to, for example, increase ink cohesive strength relative to an adhesive strength of the ink to the reimageable plate surface. In embodiments, certain curing mechanisms may be employed. These curing mechanisms may include, for example, optical or photo curing, heat curing, drying, or various forms of chemical curing. Cooling may be used to modify rheology of the transferred ink as well via multiple physical, mechanical or chemical cooling mechanisms.

Substrate marking occurs as the ink is transferred from the reimageable plate surface to a substrate of image receiving media 114 using the transfer subsystem 160. With the adhesion and/or cohesion of the ink having been modified by the rheology control system 150, modified adhesion and/or cohesion of the ink causes the ink to transfer substantially completely preferentially adhering to the substrate 114 as it separates from the reimageable plate surface of the imaging member 110 at the transfer nip 112. Careful control of the temperature and pressure conditions at the transfer nip 112, combined with reality adjustment of the ink, may allow transfer efficiencies for the ink from the reimageable plate surface of the imaging member 110 to the substrate 114 to exceed 95%. While it is possible that some dampening fluid may also wet substrate 114, the volume of such transferred dampening fluid will generally be minimal so as to rapidly evaporate or otherwise be absorbed by the substrate 114.

Finally, a cleaning system 170 is provided to remove residual products, including non-transferred residual ink and/or remaining dampening solution from the reimageable plate surface in a manner that is intended to prepare and condition the reimageable plate surface of the imaging member 110 to repeat the above cycle for image transfer in a variable digital data image forming operations in the exemplary system 100.

The reimageable plate surfaces of the imaging members 110 must satisfy a range of often-competing requirements including (1) surface wetting and pinning the dampening fluid or fountain solution, (2) efficiently absorbing optical radiation from the laser or other optical patterning device, (3) wetting and pinning the ink in the imaged areas of the reimageable plate surfaces, and (4) releasing the ink, preferably at efficiencies that exceed 95%. The ink release is controlled to promote the highest levels of ink transfer efficiency to the image receiving media substrate 114 to produce high quality images, limit waste, and minimize burden on the downstream cleaning system by yielding a substantially clean plate surface at an exit of the transfer nip 112.

Reimageable plate surfaces of the imaging members are formed of materials that have been, through extensive and ongoing experimentation, determined to advantageously support the steps of the ink-based variable data digital lithographic printing process carry into effect according to systems such as that shown, in an exemplary manner, in FIG. 1. Such reimageable plate surfaces may be formed of, for example, a fluorosilicone. An infrared-absorbing filler material may be advantageously added, or otherwise included. The fluorosilicone may include amino-functional groups. The filler may be selected from the group consisting of carbon black, iron oxide, carbon nanotubes, graphene, graphite, and carbon fibers.

Extensive experimentation has been directed at optimizing filler materials and/or improvements to certain of the conventionally-employed filler materials, which may present filler materials that are more suitable for use in the reimageable plate surfaces of imaging members in variable data digital lithographic image forming devices.

Exemplary embodiments according to this disclosure may provide reimageable surfaces in a form of printing plates for imaging members usable in a variable data digital lithographic printing process that are optimized in a manner that promotes highest levels of wettability, IR energy interaction and ink transfer (while limiting a potential for ink contamination) in the printing process.

Exemplary embodiments may have printing plates formed of combinations of materials that incorporate surface-passivated carbon black particles and fluorosilicone polymers to provide optimization of the plate surfaces to support variable data digital lithographic image forming.

Exemplary embodiments may Pentafluorostyrene/maleimide-b-pentafluorostyrene polymer as a passivating layer on carbon black particles.

Exemplary embodiments may incorporate thus-passivated carbon black particles into fluorosilicone compound in a manner that yields sub-micron particles with a high degree of dispersion of the carbon black particles in the fluorosilicone compound.

Exemplary embodiments may yield a passivated carbon black plate design in which the fine dispersions enable high efficiency in IR radiation absorption In embodiments, the passivated carbon black particles are fixed into the polymer matrix so as to limit interaction with applied inks thereby mitigating potential for ink contamination.

Exemplary embodiments are described herein. It is envisioned, however, that any composition, apparatus, method, or system that incorporates features of this disclosure is encompassed by the scope and spirit of the exemplary embodiments.

DETAILED DESCRIPTION

Figure 1:
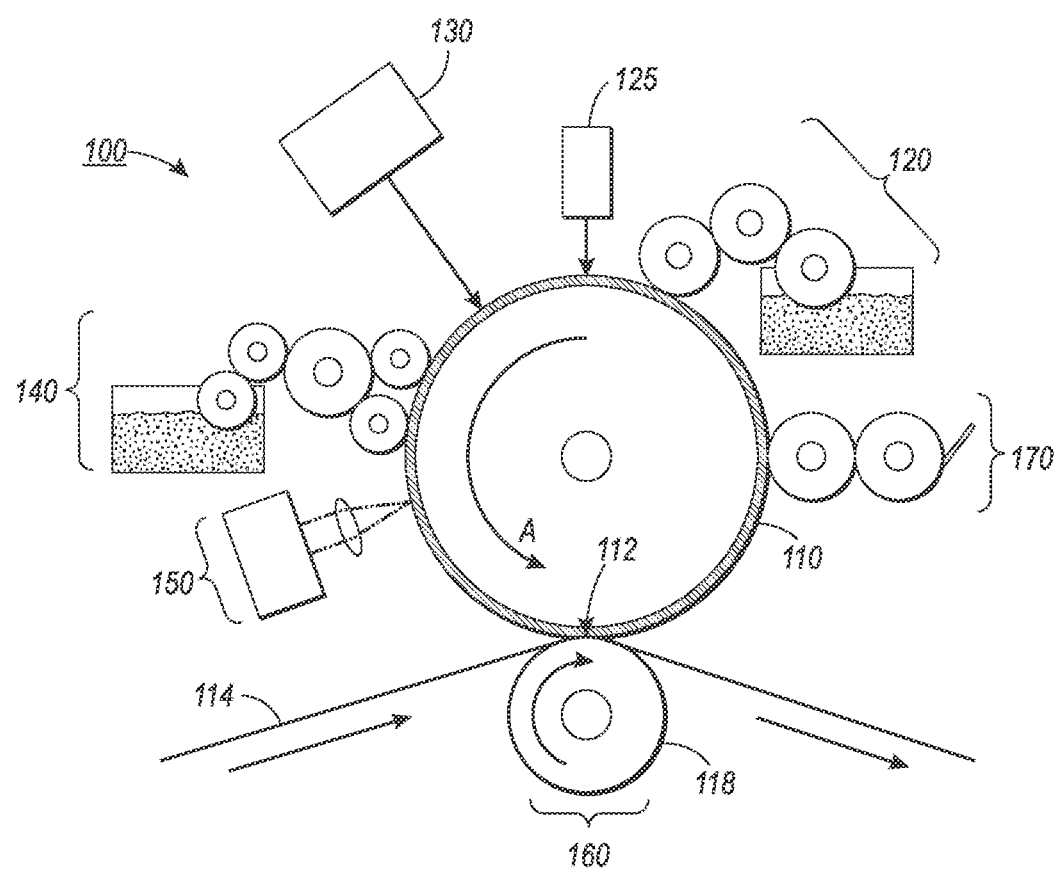
FIG. 1 schematically illustrates an exemplary embodiment of a variable data digital lithographic image forming device in which the reimageable plate surfaces may be constituted of surface passivated carbon black particles dispersed in a fluorosilicone polymer compound or layer according to this disclosure.

Exemplary embodiments are intended to cover alternatives, modifications, and equivalents as may be included within the spirit and scope of the compositions, methods, and systems described below.

The modifiers "about" and/or "substantially," when used in connection with any quantity or feature, are intended to be inclusive of any stated values and as having a meaning dictated by the context. For example, these modifiers may be used to include at least the degree of error associated with any measurement or feature that may be considered reasonable in the particular context. When used with a specific value, the use of the modifier "about" should also be considered as disclosing that specific value.

Reference is made to the drawings to accommodate understanding of an exemplary physical application of the disclosed reimageable plates, plate surfaces, plate constituent compositions, and filler components of which a plate surface may be constituted, and methods and systems for using such constituted plates and plate surfaces in accordance with the disclosed embodiments, particularly reimageable printing plates comprising polymer layers with functionalized carbon black particles dispersed therein for use with variable data digital lithographic printing systems and system components.

"Variable data digital lithographic image forming (or printing)" is a term directed to a unique class of image forming operations in which specialized reimageable plate surface configurations are provided to effect lithographic image forming operations in which images are changeable/changed on each imaging cycle of the device system implementing the image forming scheme and/or as each inked image is formed and passed through a transfer nip to transfer the inked image from the reimageable plate surface to an image receiving media substrate, or to an intermediate transfer or offset component for further transfer to the image receiving media substrate. The disclosed schemes and materials formulations, arrived at only through extensive experimentation, optimize lithographic printing of variable image data for producing images on individual image receiving media substrates in which the images are changeable with each subsequent rendering of the images on sequential substrates in the image forming process while minimizing adverse image quality effects, including ghosting ad ink contamination effects. A variable data digital lithographic image forming system more broadly is a system that is configured for lithographic printing using specially formulated lithographic inks and based on digital image data, which may be variable from one image to the next.

An imaging member surface, and particularly a reimageable plate surface of an imaging member as discussed above, generally has a tailored topology, which may be a micro-roughened surface, structured to retain a uniform layer of dampening fluid in non-image areas following imaging of a deposited layer of the dampening fluid with an imaging device. Hillocks and pits that constitute the micro-roughened surface enhance the static or dynamic surface energy forces that may attract and "pin" the dampening fluid to the reimageable plate surface. This "pinning" reduces the tendency of the dampening fluid being forced away from the reimageable plate surface by roller or other pressure nip action at an ink transfer nip, for example.

The reimageable plate surface of the imaging member, as mentioned generally above, plays multiple roles in the variable data digital lithographic image forming process. These roles may include: (1) wetting the plate surface with a uniform layer of dampening fluid, (2) pinning the uniform layer of dampening fluid with respect to the plate surface, (3) creation of a latent image through image wise patterning of the uniform layer of dampening fluid based on efficient thermal absorption of light energy from an imaging source by the plate surface, (4) wetting of the patterned (or latent image) with ink for temporary pinning of the ink to the imaged areas of the plate surface, and (5) enabling substantially complete ink lift off and transfer from the plate surface to an image receiving media substrate or intermediate transfer member, while retaining surface adhesion pinning of the patterned layer of dampening fluid.

During imaging on the reimageable plate surface, dampening fluid is removed and the bare plate surface is exposed to ink, the ink and dampening fluid constituting generally immiscible liquids or materials. As such, the reimageable plate surface should weakly adhere to the ink, yet be wettable with the ink, to promote both uniform inking of image areas and to promote subsequent transfer of the ink from the reimageable plate surface to the image receiving media substrate or intermediate transfer member. The optimization challenge that is among the objectives addressed by the below-claimed embodiments exists in formulating compositions for the constitution of the reimageable plate surfaces that promote releasing of the inks while desirably exhibiting a high tendency toward the retention of energy absorbing particles, embedded in the plate surfaces, over an extended service life for the plate surfaces.

Some other desirable qualities for the reimageable plate surface of the imaging member include high tensile strength to increase a useful service life of the surface of the imaging member, ad stability of IR absorbing materials to promote even IR absorption in the patterning process.

The disclosed schemes generally incorporate imaging members with reimageable plate surfaces that meet these requirements by including a surface or surface layer having a primary fluorosilicone constituent and an IR absorbing filler material evenly dispersed therein. The term "fluorosilicone" as used in this disclosure may refer generally to polyorganosiloxanes having a backbone formed from silicon and oxygen atoms and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit additional crosslinking. When the crosslinking is complete, such groups become part of the backbone of the overall fluorosilicone. Suitable fluorosilicones are commercially available from myriad sources.

The incorporation of IR absorbing filler materials is a requirement for laser imaging, and is beneficial in other optical image forming schemes as well. As incorporated, these filler materials require a high degree of dispersion for efficiency. These filler materials should be in a form that preferably does not interact with ink in a manner that may limit, or inhibit, transfer of the ink from the plate surface to the image receiving media substrate or to the intermediate transfer surface. The IR absorbing filler materials may absorb IR energy from the infra-red portion of the electromagnetic spectrum. This aids in efficient interaction of the energy radiated from an image wise patterning device, which may include a laser, and the dampening fluid. Known IR absorbing filler materials include carbon black, metal oxides such as iron oxide (FeO), carbon nanotubes, graphene, graphite and carbon fibers.

Figure 2:
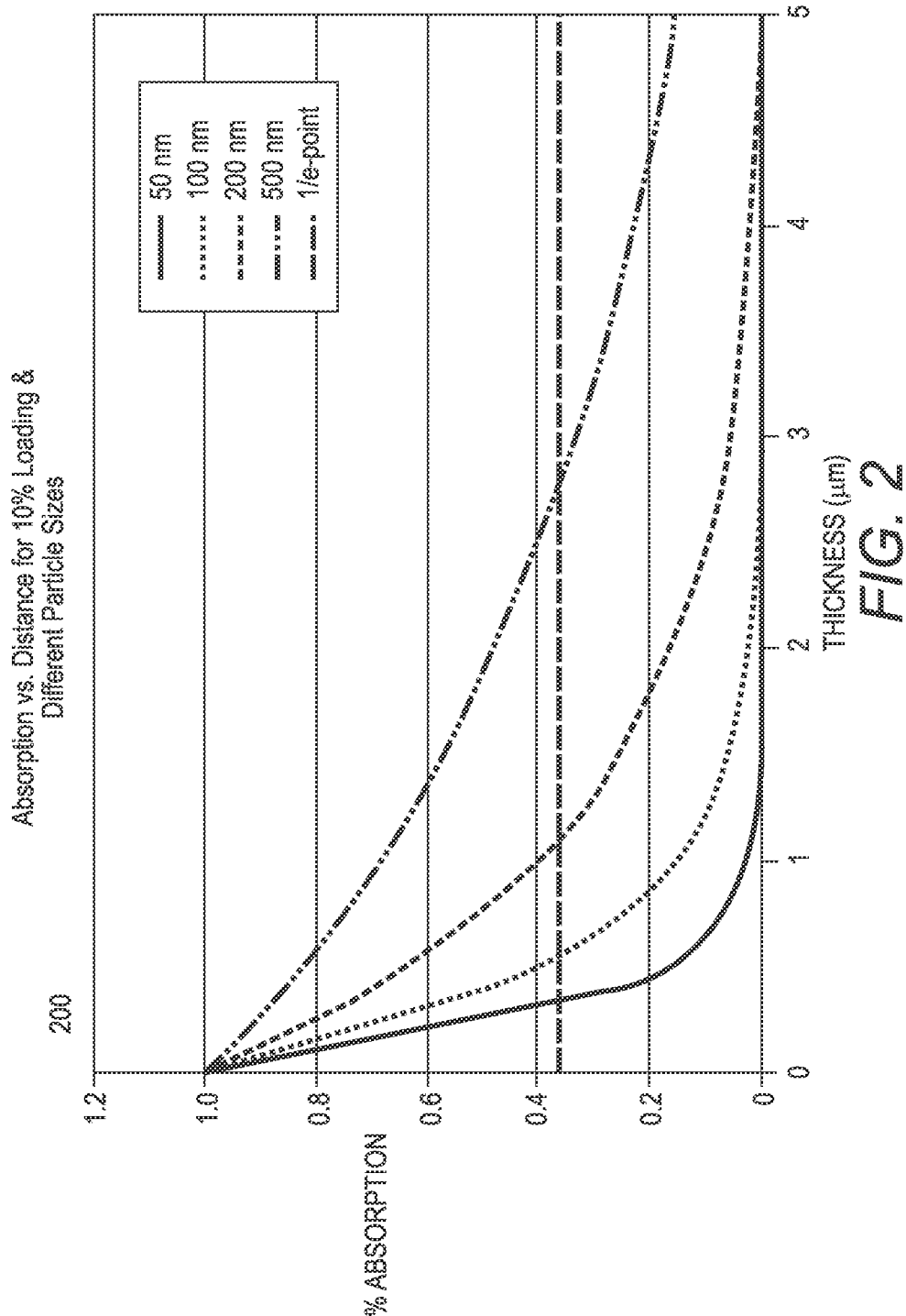
FIG. 2 illustrates a graph depicting dispersed carbon black particle size and penetration depth of IR radiation for different particle sizes usable in forming reimageable plate surfaces for use in variable data digital lithographic image forming devices according to this disclosure.

FIG. 2 is a plot 200 depicting dispersed particle sizes and penetration depth of IR radiation for different particle sizes. Penetration depths of less than 5 microns are preferable. Conventionally, incorporation of non-functionalized carbon black into silicone systems is generally limited by about a 10 micron agglomerate size, which in turn limits absorption efficiency of IR radiation, as well as overall coatability of the composite material forming the reimageable plate surface. A filler particle in accordance with embodiments of this disclosure addresses the inefficiencies encountered with non-functionalized carbon black particle inclusion by advantageously employing surface-passivated carbon black particles.

As noted above, it is important that filler particles do not negatively impact surface interactions when used in, for example, the reimageable plate surfaces of imaging members during printing operations where surface contamination may result in print defects, or system or operation failure. Adhesion sites, or sites of comparatively higher surface energy, may be formed on non-functionalized carbon black filler particle surfaces that cause such undesirable interactions. Additional issues related to non-functionalized carbon black particles are agglomerated particles that may be present at the surface of coated formulations. Such carbon black particles, for example, may "shed" during use based on inadequate "fixing" of the carbon black particles in the surface layer matrix. Unwanted ink/carbon black interactions may occur at a coated plate surface and may thus result in ink contamination with non-fixed particles of the IR absorbing material. The impact of these interactions may be minimized, or at least reduced, by functionalizing the carbon black particles with passivating molecules in the manner disclosed. Further, passivated carbon black particles may allow for comparatively finer dispersions of the filler particles in the polymer matrices, which may enhance the surface characteristics for physical interactions such as optical absorption. Finer dispersions also enable improved compatibility in a polymer matrix which may lead to enhanced mechanical properties as well.

Filler particles for dispersion in flurosilicone compositions to optimize plate surface performance characteristics in accordance with the disclosed embodiments may include carbon black particles that are surface passivated by way of poly (pentafluorostyrene/Maleimide-b-pentafluorostyrene) or P(PFS/MI-b-PFS) block copolymer being adsorbed onto the surface of the carbon black particles. Fluorosilicone surface layers filled with such particles enable increases in processing, imaging, and ink release performance in the variable data digital lithographic image forming systems and devices in which they are employed.

Carbon black is a known base material, and is known to be useful as a filler material in many uses including in imaging member surfaces. Carbon black is generally produced by the incomplete combustion of hydrocarbons, or by charring of other organic materials and is readily commercially available from one of several different sources.

P(PFS/MI-b-PFS) may be used as a permanently-attached passivating layer on the carbon black particles that results in robust surface treatment for those carbon black particles, while rendering the carbon black particles hydrophobic. The functionalization of carbon black with a passivating molecule is described, for example, in U.S. patent application Ser. No. 14/922,125, entitled "Carbon Black Polymeric Filler Useful For Printing Applications, filed on a same day as this application, the disclosure of which is hereby incorporated by reference herein in its entirety.

Filler particles in accordance with embodiments may be passivated in a process that begins with the preparation of an A/B-b-block copolymer by a living radical polymerization. Styrenics have a tendency to complex with maleic or maleimide molecules and the polymerization yields a perfectly alternating styrenic/maleic type copolymer. In the living radical polymerization system, the styrenic/maleic monomers are consumed first. Subsequently, in the presence of excess styrenic monomer, the polymer continues to grow resulting in a P(PFS/MI-b-PFS) block copolymer. This P(PFS/MI-b-PFS) block copolymer is then incorporated in a dispersion system and the maleimide moiety adsorbs onto the carbon black particles while the PFS tail gives dispersability in the fluorinated system. Carbon black particles that are passivated by P(PFS/MI-b-PFS) polymers when adsorbed onto the surface result in a robust treatment that renders the carbon black particles. The composition of these surface functionalized carbon black particles is new. This approach allows for the passivation via an absorption process that does not require heating to above 120° C. and could allow for the use of lower boiling fluorinated media.

Functionalized carbon black particles in accordance with embodiments may prove particularly suitable for fine dispersion in solvent for subsequent processing. Further, the disclosed carbon black particle compositions may be quite suitable for dispersion in fluorinated polymers, and may enable enhancement of properties of carbon black and polymeric composites by enabling comparatively reduced (or small) particle sizes and finer dispersions.

P(PFS/MI-b-PFS) functionalized particles are suitable for incorporation into fluorinated polymeric media. Particles could be readily incorporated into polymers such as fluorosilicones, polyvinylfluoride, polytetrafluoroethylene, perfluoroalkoxyfluoropolymer (PFA-teflon), FKM polymer (such as VITON), fluorinated ethylene-propylene (FEP), or other fluoropolymers. The robustness of the surface treatment is advantageous for high temperature processing techniques such as melt mixing. Incorporation of these particles into various media may be advantageous in printing and document processing applications including fusing, solid ink printing, and ink-based digital printing, for example.

The disclosed embodiments may specify a surface layer design composition for a reimageable plate surface in a variable data digital lithographic image forming device incorporating surface passivated carbon black particles with P(PFS/MI-b-PFS) used as a passivating layer on the carbon black particles. Superior compatibility with fluorosilicone enables a fine dispersion within the matrix. The P(PFS/MI-b-PFS) surface passivation of the carbon black particles aids efficient dispersion, compatibility and incorporation into the polymer matrix, and fixing within the polymer matrix in a manner that limits a potential for contamination, including ink contamination. The surface passivated carbon black filler material may be present in an amount of from 5 to 40 weight percent, or from 10 to 30 weight percent, or from 15 to 25 weight percent. The filler may be functionalized carbon black in accordance with filler compositions of embodiments.

Methods of manufacturing an imaging member plate or plate surface layer may include depositing a surface layer composition upon a mold, and curing the surface layer at an elevated temperature. The curing may be conducted at a temperature in a range, for example, from 135° C. to 165° C. Optionally, the surface layer composition may comprise a catalyst, such as platinum. The cured surface layer may have a thickness in a range of from 1 micron to 4 millimeters, or from 5 microns to 1 millimeter, or from 10 microns to 50 microns.

The cured surface layer may be confined to a thickness of less than 50 microns, or less than 20 microns, or less than 10 microns, for the purpose that the near IR radiation may be confined to the narrow topcoat layer for maximum thermal absorption and localized temperature increase. A sharp increase in temperature is necessary for the evaporation of dampening fluid during imaging. A precisely localized area of a temperature increase is necessary to support fine-grained of the dampening fluid layer for high-quality image production An example of a dampening fluid useful with an imaging member surface having the disclosed fluorosilicone and filler particle material composition may be a fluid comprising a siloxane compound. The siloxane compound may be octamethylcyclotetrasiloxane (D4).

The imaging surface layer may display a surface roughness with an Ra in a range of from 0.2 microns to 2 microns, or from 0.3 microns to 1 micron, or from 0.5 microns to 0.8 microns. The surface roughness may be spontaneously formed upon curing, or formed via a subtractive process from the surface, such as chemical etching, plasma etching, or surface roughening.

Aspects of the present disclosure may be further understood by referring to the following example. Filler compositions comprising functionalized carbon black filler material were produced that comprised hydrophobic carbon black particles passivated with P(PFS/MI-b-PFS). The carbon black particles had a diameter in a range of 50 nanometers to 1 micron, and enabled dispersion in fluorinated polymers, and fine dispersion in solvent. The example is illustrative only.

EXAMPLE

P(PFS/MI-b-PFS) was prepared. Pentafluorostyrene (24.2 g), maleimide (1.33 g) and 2,2,6,6-tetramethyl-piperidine-1-oxyl (TEMPO, 0.119 g, 0.00075 mol) were added to a round bottom flask equipped with a reflux condenser, nitrogen inlet. This was then degassed with nitrogen gas for 10 minutes and then VAZO 67 (0.095 g, 0.0005 mol) was added. The solution was then heated, while under nitrogen gas, to a bath temperature of 138° C. After the bath temperature was attained, VAZO 88 (0.015 g) was added added at 30, 60, 120, 180 and 260 minutes. The solution was heated for 7 hours and then cooled. After cooling, tetrahydrofuran (THF) was added (10 mL) and then this solution was added to methanol (200 mL) to afford a poly (pentafluorostyrene/maleimide)-b-pentafluorostyrene-TEMPO terminated P(PFS/MI-b-PFS) polymer (8.5 g).

A passivated carbon black dispersion was prepared. 325 g stainless steel shot was added to an attritor. Then, this P(PFS/MI-b-PFS) (6 g) was added to this and stirred at ~300 rpm. Subsequently, trifluorotoluene (TFT, 44 g) was added and stirred for 10 minutes. Carbon black (Mogul E, 12 g) was added to the stirred mixture, and the attritor was then stirred for 20 hours. The mixture was then sieved to give 43.8 g of carbon black functionalized dispersion with PPFS. Solids analysis showed a carbon black content of 13.3%. The particle size was 245 nm.

To a 60 mL bottle was added Nusil 9667 part A (11.25 g) and TFT (5.6 g). This was stirred for 10 minutes and to it was added the passivated carbon black filler particle dispersion (11.28 g). This was stirred for 4 hours and then to it was added Nusil 9667 part B (2.25 g). This was stirred for 15 minutes, then degassed using a vacuum pump for 15 minutes. The resulting solution was then slit coated onto a Mylar sheet to afford a carbon black dispersed fluorosilicone coating of about 120 micron thick.

It was noted that draw-down coatings of the passivated carbon black dispersion in fluorosilicone resulted in substantially smooth coatings, while attempts to surface coat dispersions containing unpassivated carbon black particles resulted in comparatively rougher surface coatings. This empirical result advantageously demonstrated comparatively finer dispersions at the coating surfaces for the passivated carbon black and fluorosilicone compositions.

Reimageable surfaces for imaging members particularly usable in variable data digital lithographic image forming schemes and associated systems will benefit from carbon black passivated with P(PFS/MI-b-PFS) being incorporated into fluorosilicone plate designs. Finer dispersions of passivated carbon black filler particles in fluorosilicone coatings, enabling for example more efficient IR absorption, are achievable. Adhering (fixing) of the passivated carbon black filler particles within the fluorosilicone matrices substantially limits the opportunity for undesirable interaction of the carbon black filler particles at the plate surface with the applied inks. The surface passivated carbon black design enables increasingly efficient processing, imaging, and ink release performance in the image forming systems.

In summary, the disclosed schemes provide a particularly advantageous design for a reimageable plate surface by introducing a unique materials composition for a digital offset printing plate containing carbon black passivated with P(PFS/MI-b-PFS) finely dispersed into fluorosilicone. In experiments, functionalization of carbon black particles with P(PFS/MI-b-PFS) was demonstrated and sub-micron particle size and fine dispersion of particles in fluorosilicone was demonstrated.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. An imaging member for an image forming device, comprising:
    a structural mounting component; and
    an outer surface layer on the structural mounting component, comprising:
        a silicone polymer substance; and
        infra-red absorbing particulates dispersed in the silicone polymer substance, the infra-red absorbing particulates being functionalized by adsorbing a block copolymer on a surface of the infra-red absorbing particulates to passivate the infra-red absorbing particulates,
        said block copolymer comprising poly-(pentafluorostyrene/Maleimide-b-pentafluorostyrene) (P(PFS/MI-b-PFS)).

2. The imaging member of claim 1, the infra-red absorbing particulates comprising carbon black particles.

3. The imaging member of claim 1, the infra-red absorbing particulates having a diameter of less than 1 micron.

4. The imaging member of claim 1, the infra-red absorbing particulates being present in an amount from 2 to 20% by weight of the outer surface layer.

5. The imaging member of claim 4, the infra-red absorbing particulates being present in an amount of substantially 10% by weight of the outer surface layer.

6. The imaging member of claim 1, the silicone polymer substance being a fluorinated polymer.

7. The imaging member of claim 6, the fluorinated polymer including fluorosilicones.

8. The imaging member of claim 1, the infra-red absorbing particulates being functionalized to be hydrophobic.

9. The imaging member of claim 1, the outer surface layer having a thickness in a range of 4 millimeters or less.

10. The imaging member of claim 9, the outer surface layer having a thickness in a range of 120 microns or less.

11. The imaging member of claim 1, the outer surface layer being a separately formed layer that is affixed to the structural mounting component.

12. The imaging member of claim 1, the outer surface layer providing a reimageable surface in the image forming device.

13. A method for forming an image forming member for an image forming device, comprising:
    functionalizing infra-red absorbing particulates by adsorbing by adsorbing a block copolymer on a surface of the infra-red absorbing particulates to passivate the infra-red absorbing particulates and yield a passivated particulate dispersion;
    dispersing the passivated particulate dispersion with a silicone polymer substance to produce a coating material; and
    applying the coating material to a surface of a structural mounting component to produce the image forming member,
    said block copolymer comprising P(PFS/MI-b-PFS).

14. The method of claim 13, the infra-red absorbing particulates comprising carbon black particles.

15. The method of claim 13, the infra-red absorbing particulates having a diameter of less than 1 micron.

16. The method of claim 13, the silicone polymer substance being a fluorinated polymer.

17. The method of claim 16, the fluorinated polymer including fluorosilicones.

18. The method of claim 13, the infra-red absorbing particulates being functionalized to be hydrophobic.

19. The method of claim 13, further comprising:
    applying the coating material to a separate processing surface to form an imaging member surface layer;
    transferring the imaging member surface layer to the structural mounting component; and
    affixing the imaging member surface layer to the structural mounting component to produce the image forming member.

20. The method of claim 19, the imaging member surface layer having a thickness in a range of 4 millimeters or less.

21. The method of claim 20, the imaging member surface layer having a thickness in a range of 120 microns or less.

22. The method of claim 19, the imaging member surface layer providing a reimageable surface in the image forming device.

23. A variable data digital lithographic image forming system, comprising:
    an imaging member including
        a structural mounting component; and a reimageable surface on the structural mounting component, the reimageable surface being formed of a material composition comprising:
a silicone polymer substance; and
infra-red absorbing particulates dispersed in the silicone polymer substance, the infra-red absorbing particulates being functionalized by adsorbing a block copolymer comprising P(PFS/MI-b-PFS) on a surface of the infra-red absorbing particulates to passivate the infra-red absorbing particulates;
a dampening fluid source that deposits a layer of dampening fluid on the reimageable surface of the imaging member;
an energy source that patterns the layer of the dampening fluid on the reimageable surface according to input image data to form a latent image on the reimageable surface; and
an inker unit that inks the latent image on the reimageable surface to form an inked image, the inked image being transferred from the reimageable surface to one of a substrate and an intermediate transfer member at an image transfer nip between the reimageable surface and the one of the substrate and the intermediate transfer member.

* * * * *